US 6,598,060 B2

(12) United States Patent
Goldick

(10) Patent No.: US 6,598,060 B2
(45) Date of Patent: Jul. 22, 2003

(54) METHOD AND SYSTEM FOR CREATING AND MAINTAINING VERSION-SPECIFIC PROPERTIES IN A DISTRIBUTED ENVIRONMENT

(75) Inventor: Jonathan S. Goldick, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 09/750,501

(22) Filed: Dec. 27, 2000

(65) Prior Publication Data

US 2002/0123992 A1 Sep. 5, 2002

(51) Int. Cl.[7] .............................................. G06F 12/00
(52) U.S. Cl. ...................... 707/203; 707/200; 707/201; 707/202; 707/204; 707/103 R
(58) Field of Search ................................ 707/200, 201, 707/202, 203, 204, 103 R

(56) References Cited

U.S. PATENT DOCUMENTS

| 5,485,601 | A | * | 1/1996 | Ching ......................... 395/500 |
| 5,515,522 | A | * | 5/1996 | Bridges et al. ............. 395/468 |
| 5,537,529 | A | * | 7/1996 | Borovoy et al. ............ 707/203 |
| 5,909,689 | A | * | 6/1999 | Van Ryzin ................... 707/203 |
| 5,996,113 | A | * | 11/1999 | Korn et al. .................. 714/807 |
| 5,999,947 | A | * | 12/1999 | Zollinger et al. ........... 707/203 |
| 6,209,128 | B1 | * | 3/2001 | Gerard et al. ................. 717/11 |
| 6,377,960 | B1 | * | 4/2002 | Qiu et al. .................... 707/203 |
| 2001/0010702 | A1 | * | 8/2001 | Ajtai et al. ................. 707/101 |
| 2001/0029517 | A1 | * | 10/2001 | De Meno et al. ........... 709/101 |

FOREIGN PATENT DOCUMENTS

EP         0 994 425 A2  *  4/2000  ........... G06F/17/30

OTHER PUBLICATIONS

Goland et al., HTTP Extensions for Distributed Authoring—WEBDAV, Feb. 1999, Copyright 1999 The Internet Society.

* cited by examiner

Primary Examiner—Frantz Coby
(74) Attorney, Agent, or Firm—Merchant & Gould P.C.

(57) ABSTRACT

A method and system creates and maintains a version-specific property or property that is stored as part of an object in a distributed environment, contains specific version information relating to how or when the property was created and is automatically invalidated when a predetermined "update" event occurs. Third party applications generally create and access these versions-specific properties to thereby eliminate the need for external logs or databases to store persistent state information.

21 Claims, 4 Drawing Sheets

METHOD AND SYSTEM FOR CREATING AND MAINTAINING VERSION-SPECIFIC PROPERTIES IN A DISTRIBUTED ENVIRONMENT

TECHNICAL FIELD

This invention relates generally to distributed computing environments and more particularly to the format and management of object properties stored as part of each object in a particular system. More particularly still, the present invention relates to the use of object properties to provide status information to third party applications.

BACKGROUND OF THE INVENTION

In a distributed environment, such as the Internet, computer information is typically stored in units known as "resources" or "objects." Resources may be any entity that can be accessed on the web through a uniform resource locator (URL) or uniform resource identifier (URI). Groups of member resources may be collected into what is known as a "collection." One particular benefit to grouping resources relates to the fact that once a group of resources are collected, they may be treated in a similar manner as computer files in a non-distributed environment, wherein both the files and the resource collections each have data and metadata. The data is the actual object data for either the object or the resource and the metadata is the information that describes the file or resource, and possibly even the data.

As the Internet and other distributed environments increase in popularity, advances are being made in the representative functionality provided to client systems as the client systems interact with server systems and the resources on the server systems. For instance, past protocols, such as Hypertext Transfer Protocol (HTTP) version 1.1 provided a client the ability to "put" information into a server-side application or document. The client used a particular Hypertext Markup Language (HTML) request that included a "PUT" command in the header. The server then interpreted this header information and executed the command.

Recent developments have increased the concept of authoring resources on a server system from client system over the distributed network. One particular example relates to the development of the WebDAV standard, which stands for the World Wide Web Distributed Authoring and Versioning standard, referred to herein as simply "DAV." DAV provides a set of headers and methods, which extend the HTTP to provide capabilities for overwrite prevention (locking), properties, and namespace management. A document that was written by the IETF and has been approved by the IESG as Proposed Standard RFC 2518, published February 1999, the standard describes DAV in more detail.

DAV provides for the creation of property objects that are associated with a resource, wherein the properties are similar to properties of a file in a more traditional file system. The properties may store information such as the name of the resource, the author of the resource, the latest version value for the resource (or collection of resources), among others.

Often, third party applications work in combination with a server-side resource systems to provide additional system features or functions, such as virus scanning functions. These third party applications may actually "intercept" each resource access attempt and scan the object for viruses or perform other tests prior to performing the actual access operation. Unfortunately however, performing a scan operation or other tests each time a resource is accessed consumes a significant amount of time. Therefore, a log of information may be maintained to store version information for each resource. For example, the log may maintain a list of resources on the system and whether each resource has been scanned, and if so, which version of virus definition file was used. Using the log of information, the virus scanner can reduce processing time by only scanning resources that are new or modified, or that were scanned by an out-of-date virus definition file.

Although the log may provide a significant improvement over systems that scan every resource before each access, using such a log suffers from some drawbacks. For example, maintaining such an information log requires a significant amount of overhead. Moreover, the process of accessing the log to determine whether items have been scanned reduces overall system performance since a separate file must be located on disk and examined. Additionally the log of information is not updated as resources are copied or backed-up causing unnecessary scanning operations in certain circumstances.

One solution to the performance problems associated with keeping an information log as a separate file has been to keep an "in-memory" log that is created and stored in volatile memory, e.g., RAM. The in-memory log may be accessed more quickly than a separate file, and therefore performance of the system increases when using the in-memory log in place of the log file described above. However, the in-memory log is erased or lost when the power is not delivered to the system, such as when the system is turned off, shut down or rebooted. Thus, any state information or version information may not be determined quickly following a cessation of power. Another drawback associated with the in-memory log is that such a log consumes a significant amount of the operating memory used by the system. Therefore, the in-memory log has not provided an adequate solution to the above-described problems.

It is with respect to these and other considerations that the present invention has been made.

SUMMARY OF THE INVENTION

The present invention solves these problems by creating and using a version-specific attribute or property that is stored as part of a resource or object collection, contains specific version information relating to how or when the property was created and is automatically invalidated when a predetermined "update" event occurs. Third party applications may generally create and access these versions-specific properties to thereby eliminate the need for external logs or databases.

An aspect of the present invention relates to a method of providing version-specific information associated with an object stored in a computer system to an application. The method involves creating a version-specific property that is associated with the object, maintaining the version-specific property to reflect relevant updates to the object by automatically invalidating the version-specific information in response to predetermined access requests and allowing the third party application to analyze the version-specific property.

In accordance with other aspects of the present invention, the application is a third party application such as a virus scan application or a replicator-type application that creates redundant copies of data objects for back-up or performance purposes. Additionally, the version-specific property of the present invention may comprise meta information, version information and mask information. The version information relates to the version of the object itself or of the application used to create the version-specific property and the mask information relates to a policy or definition of the predetermined events that may invalidate the version specific property. In yet other embodiments, the version-specific property may further comprise a digital signature or other security information to either prevent unauthorized access to the property or the data object, or to provide a validating element for other applications in determining whether the data object has been corrupted.

In accordance with still other aspects of the present invention, the version specific property may be invalidated based on predetermined events such as modification of the data within the object, the metadata associated with the object or when other version-specific properties change. The invalidation act may be a deletion or truncation of the version specific property, or any other method of indicating that the version-specific property is invalid.

In accordance with another aspect, the present invention relates to an object format having a version-specific property. The version-specific property has a meta information section, a version information section for storing information related to the version of the application that created the property, and a mask information section for storing information related to predetermined events which cause the invalidation of the property. Additionally, the invention relates to a system providing the protocol for creating and maintaining such version-specific properties.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of presently preferred embodiments of the invention, and to the appended claims.

DETAILED DESCRIPTION OF THE INVENTION

The present invention relates to a data object model that provides for the creation of version-specific properties or properties that define or provide meta information about a data object. The version-specific properties are similar to other data object properties in that they may be stored in association with a data object, whether through a meta information identification pointer or by storing the information in a resident manner with the data object itself. However, the version-specific properties have relatively different features from existing meta information properties, including the ability to store version-specific information related to the application that created the version-specific property. Moreover, the version-specific property is automatically updated upon the occurrence of a predetermined event. Indeed, information related to which events cause invalidation may also be stored as part of the version-specific property.

Figure 1:
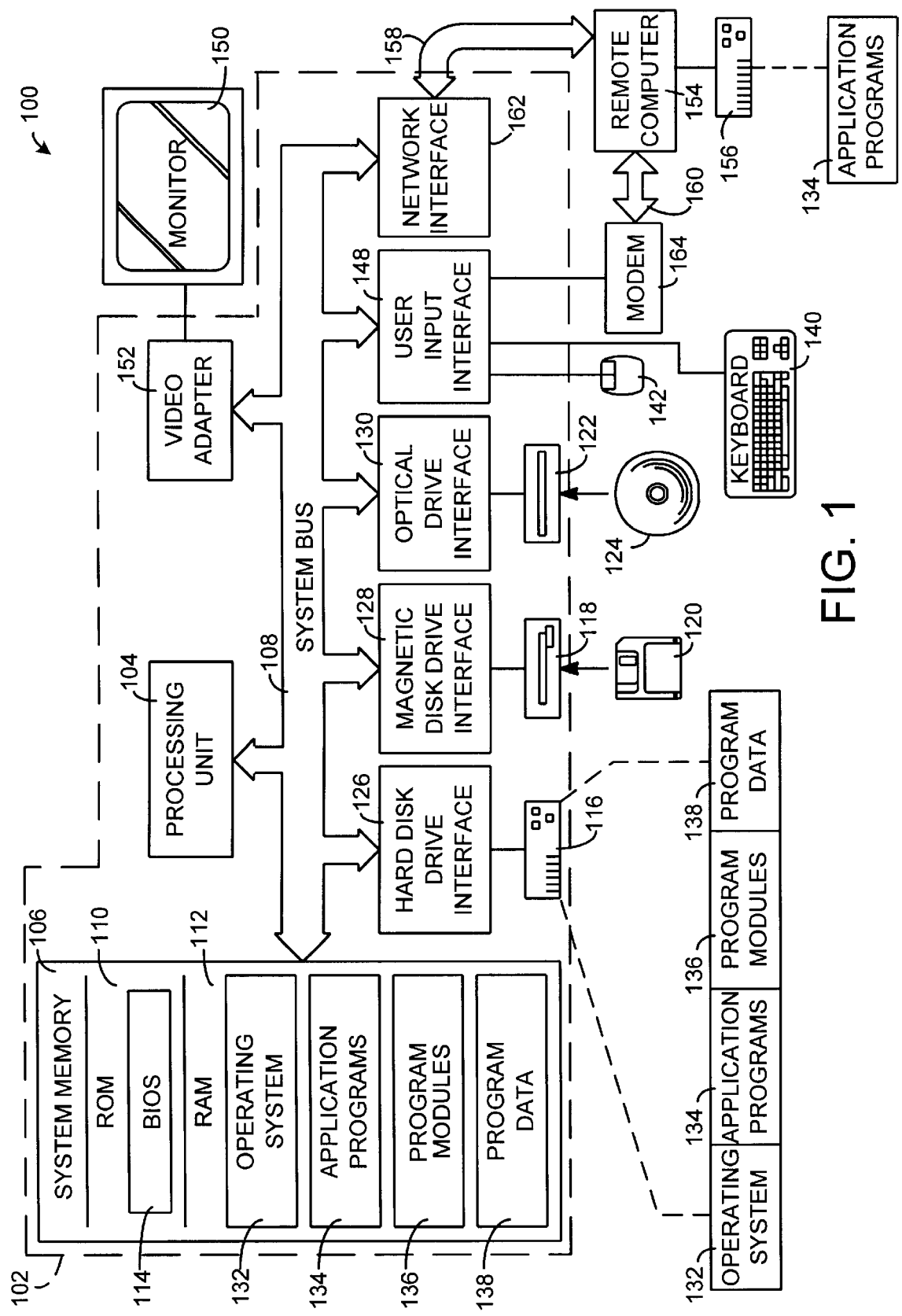
FIG. 1 is a functional diagram of a computer system that may incorporate aspects of the present invention.

FIG. 1 illustrates an example of a suitable computing system environment 100 in which the present invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

In addition to the environment 100 shown in FIG. 1, the invention may be operational with numerous other general purpose or special purpose computing system environments or configurations. Examples of well known computing system, environments, and/or configuration that may be suitable for use with the invention include, but ate not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Moreover, the present invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architectures (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDE-ROM, digital versatile disks (DVD) or other optical disk storage, magnetic cassettes, magnetic tape, magnetic disk storage or other magnetic storage devices, or any other medium which can be used to store the desired information and which can be accessed by computer 102. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110, RAM 112 typically contains files and/or program modules that are immediately accessible to and/or presently being operated on by processing unit 104. By way of example, and not limitation, FIG. 1 illustrates operating system 132, application programs 134, other program modules 136, and program data 138. Additionally, the computer 102 comprises a file system, which defines the format for the files of system 102, and further defines version-specific property formats, as discussed below.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through an non-removable memory interface such as interface 126, and magnetic disk drive 118 and optical disk drive 122 are typically connected to the system bus 108 by a memory interfaces, such as interfaces 128 and 130, respectively.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138.

A user may enter commands and information into the computer 102 through input devices such as a keyboard 140 and pointing device 142, commonly referred to as a mouse, trackball or touch pad. Other input devices (not shown) may include a microphone, joystick, game pad, satellite dish, scanner, or the like. These and other input devices are often connected to the processing unit 104 through an input interface 148 that is coupled to the system bus 108. A monitor 150 or other type of display device may also be connected to the system bus 108 via video adapter 152. In addition to the monitor, computers may also include other peripheral output devices such as speakers and printer not shown.

The computer 108 may operate in a networked environment using logical connections to one or more remote computers, such as a remote computer 154. The remote computer 154 may be a personal computer, a server, a router, a network PC, a peer device or other common network node, and typically includes many or all of the elements described above relative to the computer 102.

When used in a LAN networking environment, the computer 102 is connected to the LAN through a network interface or adapter 162. When used in a WAN networking environment, the computer 102 typically includes a modem 164 or other means for establishing communications over the WAN, such as the Internet. The modem 164, which may be internal or external, may be connected to the system bus 108 via the user input interface 148, or other appropriate mechanism. In a networked environment, program modules depicted relative to the computer 102, or portions thereof, may be stored in the remote memory storage device. It will be appreciated that the network connections shown are exemplary and other means of establishing a communications link between the computers may be used.

Figure 2:
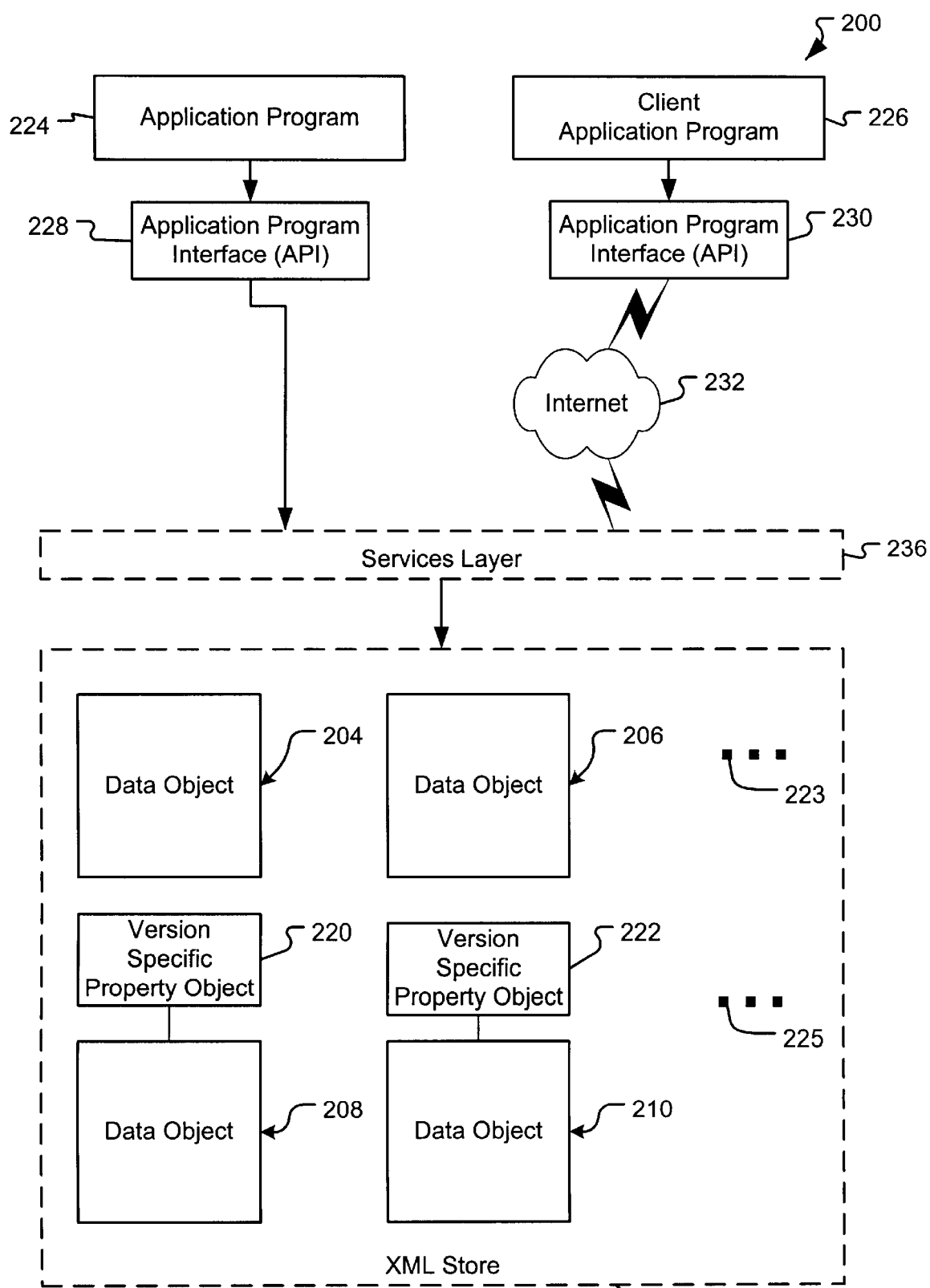
FIG. 2 is a block diagram illustrating software components of the present invention.

FIG. 2 illustrates an example of software operating environment 200 in which the invention may be implemented. The software operating environment 200 is only one example of a suitable operating environment and is not intended to suggest any limitation as to the scope of use or functionality of the invention. The software environment 200 has an XML Store 202 which defines the format and structure of data objects, such as data objects 204, 206, 208 and 210. Typically, the XML Store 202 also provides the overall structure in which objects are named, stored and organized. Additionally, the store provides the protocols for accessing any object within the store 202. Although shown in relation to an XML store, other data object configurations or collections may incorporate the aspects of the present invention. Data objects 204, 206, 208 and 210 are XML data objects that represent actual file-type data. The objects 204, 206, 208 and 210 may be accessed and/or modified by a user or another program module. Of course, the XML Store 202 may comprise many other objects as indicated by ellipses 223 and 225.

Typically, each data object 204, 206, 208 and 210 has some form of meta information object (not shown) that is associated with each object, the meta information comprises information such as the author of the object, the time the object was last accessed, among others. This meta information may be stored as part of the data object or as part of another object having a pointer or some other identifying element that associates the meta information object with its particular data object.

In addition to the meta information objects, a data object may also be associated with a version-specific property object, such as objects 220 and 222. Version specific properties 220 and 222 are associated with data objects 208 and 210, respectively. The version-specific properties 220 and 222 comprise version-specific information and may be invalidated by other events occurring with respect to the objects 208 and 210 respectively.

The software environment 200 shown in FIG. 2 also illustrates the interaction of the XML Store 202 and application programs, such as applications 224 and 226. In one embodiment, application program 226 is a client application program that operates on a client system apart from a server system, which is the location of the XML Store 202. In other embodiments, the application program, i.e., program 224 may actually be part of the server system. Applications 224 and 226 interact with the XML store 202 through application program interfaces 228 and 230, respectively. Additionally, the application interfaces 230 may actually communicate with the XML store 202 through a complex network, such as the Internet 232, according to predefined protocols. Importantly, in the present invention an application or program module, such as applications 224 and 226, communicates with the XML store 202 in one way or another, to access data objects, such as objects 204, 206, 208 and 210 wherein the access may involve moving, copying, deleting, reading, executing or updating the object, among others.

Application programs 224 and 226 may access the objects 204, 206, 208 and 210 through a layer of application modules, i.e., the services layer 236. The services layer 236 may provide various functions, such as ensuring that an object access request relates to an existing object, whether the module making the request has permission to make and perform the request, among others. This layer of interaction 236 is in addition to possible application program interfaces 228, 230 and possible operating system interfaces (not shown) that may be part of the client or server computer systems.

With respect to the version-specific properties 220 and 222, in an embodiment of the invention, application programs 224 and 226 may create and use the version-specific properties 220 and 222 related to objects 208 and 210 respectively. Alternatively the services layer 236 may create and use the version-specific properties. Once a version-specific property has been created, another application may access the property and decide to perform an operation on the object based on the evaluation of the version-specific property 220 or 222. Additionally, the other applications may perform actions on a data object that may invalidate the version-specific property thereby causing a different result once an application tests for the existence of a valid version-specific property.

In one particular example, the services layer 236 provides a virus-scan function that performs virus scanning and cleaning functions each time an object, e.g., objects 204, 206, 208 or 210, is accessed by any other application or module. To further expand the example, the application program 224 may be a word processing application and the objects 204, 206, 208 and 210 are word processing type objects such as XML objects having specific text components. In such a case, the virus scan program module, as part of services layer 236, may actually be utilized to scan objects that the word processing application 224 requests to access. In this example, the virus scanner may create version-specific properties, such as properties 220 and 222 for objects that have been scanned for viruses. Therefore, the next time a request is made by application 224 for one of the objects 208 and 210, the virus scan application merely identifies the existence of a valid version-specific property, such as property 220 and 222, to determine whether another scan operation is necessary. If a valid version-specific property is identified, then no scan is necessary in this particular example. Contrarily, if no version-specific property is identified, such as when object 204 or 206 are accessed, then the virus scan application recognizes that these objects have either not been scanned or have been modified since the time when they were scanned.

Continuing with the virus-scan example, assuming virus scan application, as part of services layer 236, scans one of the objects 204 or 206, a new version-specific property (not shown) may then be created and associated with the scanned object. The newly created property (not shown) is then stored along with the object so that the property is available for future access requests.

In another embodiment, the version-specific property may be encoded with a digital signature that may be accessed and evaluated by other applications. This digital signature can then be tested to determine whether the file is a valid copy. In such a case, if the file has been tampered with by another application, i.e., corrupted, the digital signature will be invalidated. An invalidated digital signature may be treated as if the signature did not exist and, consequently, the data object may be treated as invalid.

The version-specific attribute may further comprise other security information to prevent unauthorized access to the attribute or the data object. This information is used by the services layer 236 as a means to lock the property from use by inappropriate applications, such as virus applications. The services layer may be configured to evaluate the version-specific property on each access for the purposes of ensuring that only valid applications access the property, or the data object itself.

Figure 3:
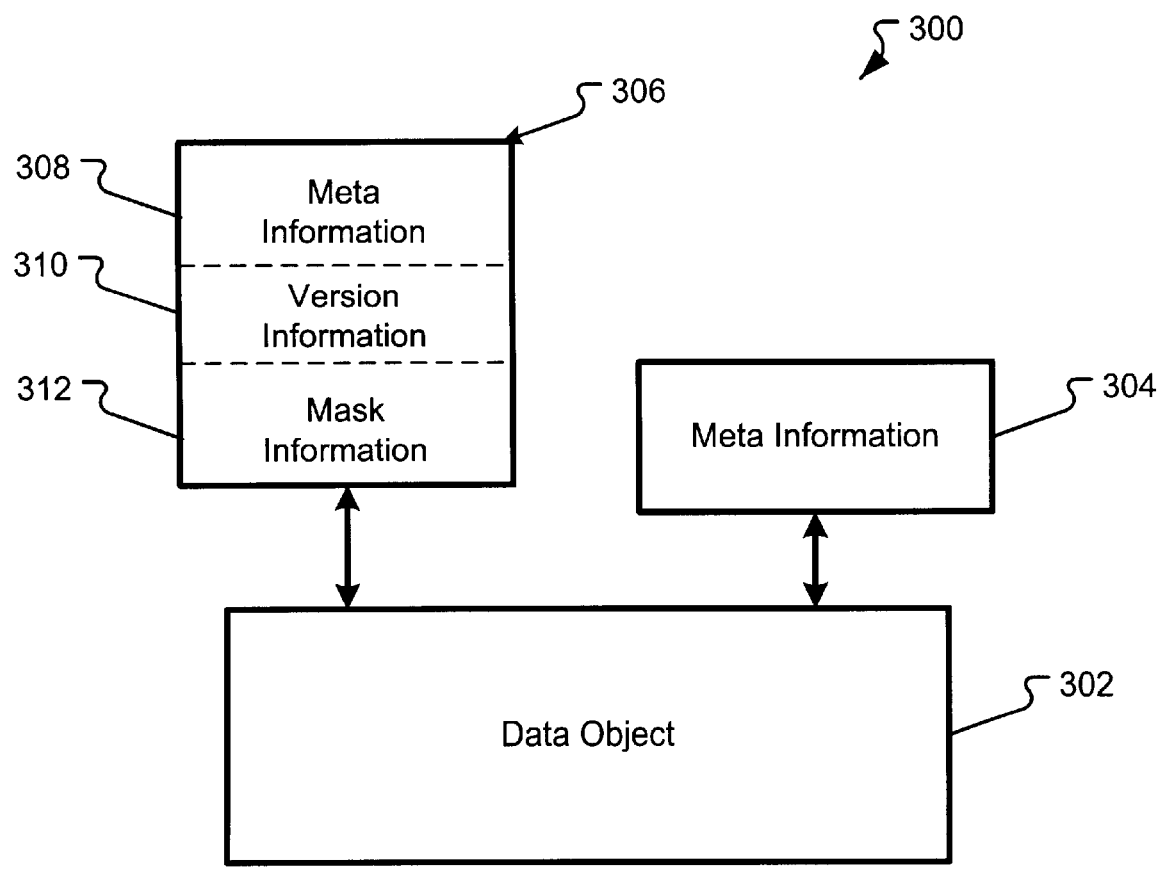
FIG. 3 is a functional diagram illustrating the components of a resource according to the present invention.

A collection 300 of objects incorporating aspects of the present invention is shown in FIG. 3. The collection 300 has a data object 302 which relates to the actual object information. Additionally, the collection 300 has a meta information object 304, which, in this particular example, comprises general information including some standard properties, such time or object size. In other embodiments, the meta information object 304 may not include standard properties, and instead the standard properties would be stored in yet another object (not shown).

The collection 300 also has a version-specific property 306 as shown in FIG. 3. The version-specific property 306 comprises three types of information. It has a meta information section 308, which typically has a name for the property such as the name of the third party application used to create the property, and possibly other information, such as the length of the property, its address location on the disk, among others.

The version-specific property 306 also has a version information section 310. The version information section 310 comprises information related to the version of the specific application that was used most recently to create the version-specific property 306, such as the version of the third party application used to create the property. That is, since such version information may be relevant to the program module that is evaluating the property, a section is dedicated to this type of information.

The version-specific property 306 also comprises a mask information section 312 which is used to provide information to the server system as to what is a relevant update. The mask information section 312 essentially dictates to other applications or to the server system the protocol or policy in which events may or may not invalidate the version-specific property 306.

In a particular embodiment, if the version-specific property 306 was created by a virus scan application, then the meta information section 308 may hold the name of the virus scan application used to create the version-specific property 306. Additionally, the version information section 310 would include information related to the particular virus definition file used when the version-specific property 306 was created. Version information in this particular instance is important because virus scan applications are frequently updated to include recently detected viruses. Therefore virus scan applications should not only determine whether an object has been scanned previously, but whether it has been scanned with an updated virus definition file.

With respect to the mask information section 312, when a virus scan application creates the version-specific property 306, the mask information section 312 may include the specific events that would cause an invalidation of the version-specific property 306, wherein the events may be uniquely pertinent to a virus scan application. Such events that may cause an invalidation of property 306 in this particular instance may include modifying the data object 302, either by adding new data or by erasing data. In other embodiments, other predetermined events may cause the invalidation of version-specific property, such as modification of another property associated with the data object 302, among others.

In this particular example, predetermined events that may specifically not be included in the mask information section 312 and therefore do not cause the version-specific property to be invalidated may include read only access events, changing the name of the object, or backing up the object collection 300. Indeed, if the event does not cause the version-specific property to be invalidated than the property remains associated with the object 302, even in such cases as when the name of the object is changed.

The version-specific property 306 is created by a third party application, e.g., an application separate from the particular object store. In creating the version-specific property, the third party application supplies the name, version and mask information to the server system, where the XML object is stored. The server system then creates and associates the property with the particular data object. Alternatively, the version specific property may be created and stored on a remote computer system, as long as the property is associated with the data object 302.

In an embodiment of the invention, the version specific property is an extension of the HTTP, as part of WebDAV, i.e., the World Wide Web Distributed Authoring and Versioning protocol (DAV). In essence, the version-specific property is a new type of DAV property and has the same live/dead degree of freedom as other DAV properties, i.e., where a live property is managed at a server and dead property is managed at the client. In order to define a new version specific property in DAV the document type definitions (DTD) shown in Table 1 may be implemented. Of course these samples could also be written as schemas.

TABLE 1

1 Name: versionspecificproperty
  Namespace: DAV:
  Purpose: Specifies that a property is version-specific and defines its characteristics.
  Description: The versionspecificproperty XML element specifies when a version-specific property is invalidated due to updates to the containing element and whether it should be preserved in COPY operations. If this XML element is not included in the request body then the server can assume that the property is not version-specific.
  <!ELEMENT versionspecificproperty (copybehavior?, isreplicator?, invalidationrule?, contents)>
2 Name: copybehavior
  Namespace: DAV:
  Purpose: Specifies whether the property should be preserved across a COPY operation.
  Description: The copybehavior XML element specifies whether a version-specific property is preserved across a COPY operation or not. If this XML element is not included in the request body then the property will be omitted in a COPY operation.
  <!ELEMENT copybehavior (omit | keep)>
  <ELEMENT omit EMPTY>
  <!ELEMENT keep EMPTY>
3 Name: isreplicator
  Namespace: DAV:
  Purpose: Specifies whether the property is of the replicator class of properties.
  Description: The isreplicator XML element specifies whether a version-specific property is of the replication class or not. A replicator class property is special in that it is normally invalidated when any type of property is changed in the containing object, including other version-specific properties, but excludes changes to other replicator class properties. If this XML element is not included in the request body then the property will not be considered replicator class.
  <!ELEMENT isreplicator (yes | no)>
  <!ELEMENT yes EMPTY>
  <!ELEMENT no EMPTY>
4 Name: invalidationrule
  Namespace: DAV:
  Purpose: Specifies when the property's contents should be set to the empty string based on changes made to the containing element.
  Description: The invalidationrule XML element specifies when a version-specific property's contents are invalidated due to updates to the containing element. The rule can include general things like updates to any immutable property and/or specific lists of properties to include or exclude. If this XML element is not included in the request body then the property's contents will be invalidated when any immutable property is updated. The version-specific property itself is always considered to be a part of its own exclusion list. That is, update to this property will never cause it to be invalidated. The exclusion list, if any, has precedence over the inclusion list.
  <!ELEMENT invalidationrule (inclusionlist+, exclusionlist*)>

TABLE 1-continued

5  Name: inclusionlist
   Namespace: DAV:
   Purpose: Specifies a list of properties for which an update should cause the property's
   contents should be set to the empty string.
   Description: The inclusionlist XML element specifies the list of properties for which an
   update should cause the version-specific property's contents to be set to the empty
   string. The list can include the special keywords immutable, nonversioned, and
   nonreplicator as well as a list of URIs of named properties.
   <!ELEMENT inclusionlist (updaretype, (immutable | nonversioned | nonreplicator |
   href+))>
6  Name: updatetype
   Namespace: DAV:
   Purpose: Used to indicate what types of property changes should be considered.
   Description: The updatetype XML element indicates what types of property updates
   should be considered when determining if a version-specific property should be
   invalidated. If this XML element is not included in the request body then only new and
   changed properties will be considered.
   <!ELEMENT updatetype (newproperty?, changedproperty?, deleTedproperty?)>
7  Name: newproperty
   Namespace: DAV:
   Purpose: Used to indicate that adding new properties to the containing object should
   be considered as a relevant update.
   Description: The newproperty XML element indicates that adding new properties to the
   containing object should be considered as a relevant update.
   <!ELEMENT newproperty EMPTY>
8  Name: changedproperty
   Namespace: DAV:
   Purpose: Used to indicate that altering an existing property in the containing object
   should be considered as a relevant update.
   Description: The changedproperty XML element indicates that altering an existing
   property in the containing object should be considered as a relevant update.
   <!ELEMENT changedproperty EMPTY>
9  Name: deletedproperty
   Namespace: DAV:
   Purpose: Used to indicate that deleting properties from the containing object should
   be considered as a relevant update.
   Description: The deletedproperty XML element indicates that deleting properties from
   the containing object should be considered as a relevant update.
   <!ELEMENT deletedproperty EMPTY>
10 Name: immutable
   Namespace: DAV:
   Purpose: Used to indicate that an update to any immutable property in the containing
   object should cause the property's contents to be set to the empty string.
   Description: The immutable XML element indicates that an update to any immutable
   property should cause the version-specific property's contents to be set to the empty
   string. Updates to immutable properties are generally considered those that would
   advance the object's version number.
   <!ELEMENT immutable EMPTY>
11 Name: nonversioned
   Namespace: DAV:
   Purpose: Used to indicate that an update to any property that is not version-specific in
   the containing object should cause the property's contents to be set to the empty string.
   Description: The nonversioned XML element indicates that an update to any property
   that is not version-specific should cause the version-specific property's contents to be
   set to the empty string. This includes both mutable and immutable properties.
   <!ELEMENT nonversioned EMPTY>
12 Name: nonreplicator
   Namespace: DAV:
   Purpose: Used to indicate that an update to any property that is not a replicator class,
   version-specific property in the containing object should cause the property's contents
   to be set to the empty string.
   Description: The nonreplicator XML element indicates that an update to any property
   that is not a replicator class, version-specific property should cause the version-specific
   property's contents to be set to the empty string. This includes both mutable and
   immutable properties, as well as some version-specific properties. A replicator class,
   version-specific property would likely choose this as its inclusionlist setting.
   <!ELEMENT nonreplicator EMPTY>
13 Name: exclusionlist
   Namespace: DAV:
   Purpose: Specifies a list of properties for which an update should not cause the
   property's contents should be set to the empty string.
   Description: The exclusionlist XML element specifies the list of properties for which
   an update should not cause the version-specific property's contents to be set to the
   empty string. The list can include the special keywords immutable, nonversioned, and
   nonreplicator as well as a list of URIs of named properties. The version-specific
   property itself is always considered to be a part of its own exclusion list. That is, TABLE 1-continued update to this property will never cause it to be invalidated. The exclusion list, if any, has precedence over the inclusion list.
<!ELEMENT exclusionlist (updatetype, (immutable | nonversioned | nonreplicator | href+))>

In order to actually create a version specific property, the third party application uses standard DAV mechanisms, such as PROPPATCH, PUT, etc. These mechanisms are described in more detail in the Appendix A. In alternative embodiments, these version specific properties are created using other methods.

Although the collection 300 is shown and described as having only one version specific property, the collection 300 may have other properties, including other version specific properties as well. Indeed, several third party applications may request that persistent state information be in association with and thus numerous version specific properties, such as property 306 may be created and stored along with collection 300.

The exemplary physical environment having now been discussed, the remaining part of this description section will be devoted to a description of the operative modules embodying aspects of the invention. The logical operations of the various embodiments of the present invention are implemented (1) as a sequence of computer implemented steps or program modules running on a computing system and/or (2) as interconnected hardware or logic modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 4:
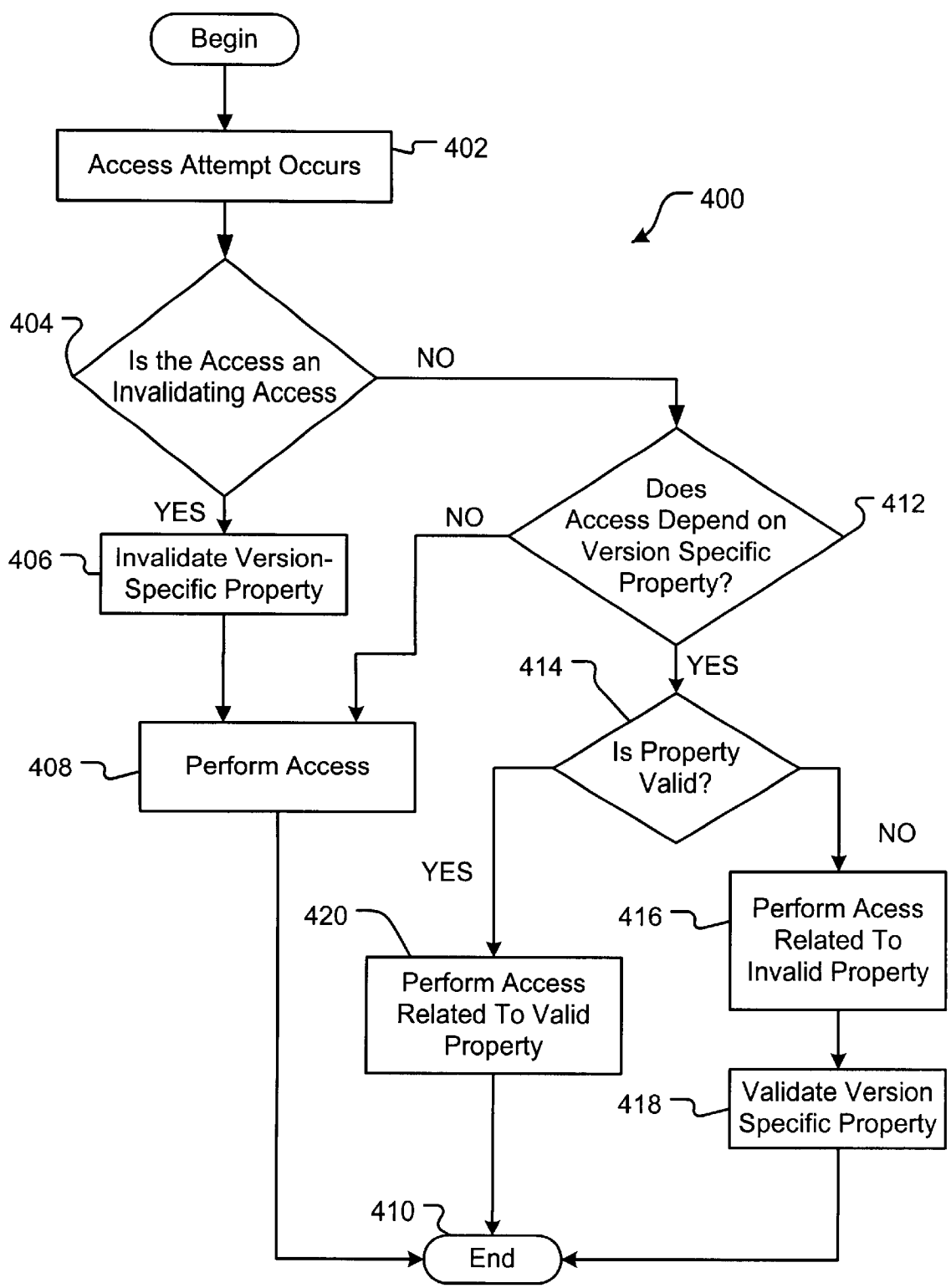
FIG. 4 is a flow diagram illustrating the functional characteristics of an embodiment of the present invention.

FIG. 4 is a flow chart of the operational characteristics related to accessing an object according to aspects of the present invention. Prior to the beginning of flow 400 an object such as objects 204, 206, 208 or 210 shown in FIG. 2 exists within an XML store, such as store 202 (FIG. 2). In an embodiment of the invention, once an object has been created, then any attempt to access that object initiates the flow 400 shown and described with respect to FIG. 4. Indeed, process 400 begins with access attempt 402, wherein the access attempt 402 relates to any read, execution, or update to an object. The access attempt may be performed by the third party application, such as application 224 (FIG. 2) or by the services layer 236 (FIG. 2).

Following access attempt 402, determination act 404 determines whether the access is an invalidating access. Determining whether or not an access is an invalidating access involves an evaluation of mask information within each version-specific property, assuming there is more than one, of the particular object being accessed. Evaluating the mask information provides what types of accesses to that object require that the particular version-specific property should be invalidated. Consequently, comparing the mask information to the actual access attempt provides whether the version-specific property should be invalidated. When such a relevant-update access attempt is identified by determination act 404, flow branches YES to invalidate operation 406.

In an embodiment of the invention the version-specific property is created and used by a virus-scan application. In such a situation, determination act 404 determines whether the access attempt is a relevant update access based on a criteria set by the virus-scan application. That is, the virus-scan application has predetermined what a relevant update access is, such as whether the access attempt will modify actual object data by changing old data or adding new data. For example, a particular virus-scan application may want its version-specific property to be invalidated whenever any change is made to data within the object, including the creation of new data. Invalidations should not occur when changes involve only version-specific properties or other object metadata or meta information.

In an alternative embodiment, a replicator application may create and use the version-specific property. In such a case, the replicator application may want its version-specific property to be invalidated whenever any change is made to either the data or metadata of the object. These particular version-specific properties should be invalidated whenever any change is made that does not solely affect this class of version-specific properties. In this instance, by defining a specific class we prevent the presence of multiple replicators from causing an object to be replicated over and over again, where each instance of replication by one replication application appears as a need to replicate by a second replicator application.

Invalidate operation 406 invalidates the version-specific property. Invalidating a version-specific property may be accomplished, in one embodiment, by deleting or truncating that version-specific property. Alternatively, the invalidate operation 406 marks the version-specific property or otherwise provides an indication that the property is invalid. In essence, the act of invalidating the property must allow the application that relies on the version-specific property to recognize that the version-specific property has been invalidated, such as by setting its contents to an empty string. Other methods of invalidating the version-specific property may include adding more information to the invalidating access or to the version-specific property or modifying the information therein. The invalidation act 406 does not change other properties, such as the property related to the last time the object was access or written to, etc.

If the data object has more than one associated version-specific property then operations 404 and 406 are repeated for each version-specific property.

Following the invalidation act 406, perform access operation 408 performs the requested access on the object. Importantly, the act of performing the access on the object is initiated after the version-specific property has been invalidated. Otherwise, the version-specific property may be unreliable. Following perform access operation 408, flow 400 ends at end operation 410.

If determination act 404 determines that the access attempt does not relate to an invalidating access, then flow branches NO to determination operation 412. Determination operation 412 determines whether the access depends on a version-specific property, e.g., whether the access attempt is an access attempt by an application that uses the version-specific property in performing its operations. For example, a virus scan application that uses version-specific properties may be generating the access attempt, and in such a case, determination operation 412 determines that the access attempt is generated by such an application that uses the version specific properties.

If the access attempt is not performed by an application relying on version-specific properties then flow branches NO to perform access operation 408. Perform access operation 408 performs the originally requested access operation. In the case where perform access operation 408 follows determination operation 412, then the access operation does not relate to an operation requiring invalidation, as determined by determination act 404. For example, the access attempt may relate to a read operation wherein the user is not allowed to modify any actual data. Following perform access operation act 408 the process flow ends at 410 as discussed above.

If determination operation 412 determines that the access does depend on version-specific property, then flow branches YES to determination act 414. Determination act 414 analyzes the version-specific property to determine whether it is valid. Determining whether a property is valid may involve determining whether the property exists, whether it has been marked as invalid, or whether it has been truncated so that information is not fully available, among other methods of determining whether the property is valid. If determination act 414 determines that the property is not valid, then flow branches NO to perform access related to invalid property act 416.

Perform act 416 performs a predetermined function based on the determination that the access is invalid. In an embodiment, if the access attempt is generated by a virus scan application, then perform operation 416 relates to performing such a virus scanning function on the object.

Following the performance of the operation related to invalid property 416, create version-specific property act 418 creates or validates a version-specific property with respect to that object. Validating a version-specific property may involve creating a version-specific property for that object, or adding more information to the existing version-specific property. Other embodiments may validate the property in other ways, as long as the property appears valid at a later time by providing an indication the property is valid. Following the validate version-specific property act 418, process 400 ends at end operation 410.

If determination act 414 determines that the version-specific property was valid, then flow branches YES to perform operation 420. Perform operation 420 relates to performing any act related to a determination that the version-specific property was valid. Depending upon the particular application that uses version-specific properties, perform operation 420 may comprise different types of operations. In one example, if the property is determined to be valid, then no operation is performed such as in the virus scan situation. In such a case, if the determination act 414 determines that the version-specific property is valid, then the object has been scanned previously and another scan is not necessary. Consequently, no operation is to be performed on that object and operation 420 simply passes to control end operation 410. In other embodiments, a determination that the version-specific property is valid may initiate an operation be performed at 420.

The above described system and method provides a significant advantage over prior methods of providing version information to program modules or applications since the version information is part of the object or object collection, as opposed to being resident in a separate log or database file. The accessing application is not required to access exterior-type files that may be unavailable, corrupt or otherwise unmanageable. Additionally, the property is not lost when the power is shut off and the property does not consume extraordinary amounts of operating memory, as is the case for in-memory information logs. Moreover, the process automatically updates, i.e., invalidates the version specific information when a relevant event occurs. Moreover, the process automatically updates, i.e., invalidates the version specific information when a relevant event or update occurs. Automatically invalidating version specific information prevents relevant updates from being missed and further increases the probability that unnecessary actions are not taken. For example, with respect to the virus scan embodiment, version information is not to be invalidated on a backup or copy function such that future accesses do not require virus scanning, where prior art methods did not maintain such version information following backup and/or copy functions and therefore additional processing steps were performed.

As discussed above, the invention described herein may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

Additionally, although the invention has been described in language specific to structural features and/or methodological steps, it is to be understood that the invention defined in the appended claims is not necessarily limited to the specific features or steps described. As an example, other applications may utilize version specific properties besides virus scanning applications and replicators. Additionally, other types of objects and object stores, other than XML object stores, may benefit from the principles of the present invention. Therefore, the specific features and steps are disclosed as preferred forms of implementing the claimed invention.

What is claimed is:

1. A method of providing version-specific information associated with an object stored in a computer system, the version specific information provided in a distributed environment, the method comprising:

receiving a request from an application to create a version-specific property, wherein the property is associated with the object;

maintaining the version-specific property to reflect relevant updates to the object by automatically invalidating the version-specific information in response to a predetermined access request;

receiving a request by the application to evaluate the version-specific property; and providing the version specific information to the application in response to the request to evaluate the version specific property.

2. A method is defined in claim 1 wherein the application is a virus scan application.

3. A method is defined in claim 1 wherein the application is a replicator application.

4. A method is defined in claim 1 wherein the version-specific property comprises meta information and mask information, the mask information providing information related to which predetermined events invalidate the version-specific property.

5. A method is defined in claim 1 wherein the predetermined event is an update to object data.

6. A method as defined in claim 1 further comprising:
providing mask information as part of the version-specific property; and
determining the predetermined event based on the mask information.

7. A method of as defined in claim 1 wherein the method further comprises:
providing security information within the version-specific property.

8. A method is defined in claim 1 wherein the invalidating act further comprises deleting the version-specific property.

9. A computer program product readable by a computer and encoding instructions for executing the method recited in claim 1.

10. A method of accessing an object stored in a computer system, the object having an associated version-specific property, said method comprising:
receiving an access attempt relating to an access request;
determining whether the access attempt relates to an invalidating access;
if the access attempt relates to an invalidating access:
invalidating the version-specific property;
performing the access operation related to the access request; and
if the access attempt does not relate to an invalidating access then performing the access operation related to the access request.

11. A method of accessing an object stored in a computer system, the object having an associated version-specific property, said method comprising:
receiving an access attempt relating to an access request;
determining whether the access attempt relates to an invalidating access;
if the access attempt relates to an invalidating access:
invalidating the version-specific property;
performing the access operation related to the access request; and
if the access attempt does not relate to an invalidating access:
determining whether the access depends on the version specific property;
if the access does not depend on the version specific property, then performing the access operation related to the access request:
if the access depends on the version specific property:
determining whether the property is valid;
performing a predetermined operation based on whether the property is determined to be valid.

12. A computer program product readable by a computer and encoding instructions for executing the method recited in claim 11.

13. A computer-readable medium having stored thereon a version-specific object, wherein the version-specific object is associated with a data object, the version-specific object comprising:
a version specific property section, wherein the version-specific property section is created by a third party application, and wherein the version-specific property is invalidated in response to a predetermined event.

14. A computer-readable medium as defined in claim 13 wherein the version-specific property comprises:
a meta information section for storing the name of the property;
a version information section for storing information related to the version of the third party application used to create the version-specific application; and
a mask information section for storing information related to predetermined events for invalidating the version-specific property.

15. A computer-readable medium as defined in claim 13 wherein the third party application performs virus scanning functions and wherein the version information section stores information related to a virus definition file.

16. A computer-readable medium as defined in claim 15 wherein the predetermined event relates to a modification of the object.

17. A computer program product readable by a computer and encoding instructions for executing a computer process for managing version-specific information for a data object within a distributed environment, said computer process comprising:
storing version-specific information as an property associated with the data object to create a version-specific object for the data object; and
invalidating the version-specific object in response to a predetermined access attempt.

18. A computer program product as defined in claim 17 the computer comprises a services layer and the acts of storing and invalidating are performed by the services layer.

19. A computer program product as defined in claim 17 wherein the version-specific information relates to third party application information.

20. A computer program product as defined in claim 19 wherein the third party application performs virus scanning functions and wherein the predetermined access attempt relates to a modification of the object.

21. A computer program product as defined in claim 20 wherein the version-specific object remains intact following one of the following access attempts: copy, rename or backup.

* * * * *